US012760422B2

(12) United States Patent
Gody et al.

(10) Patent No.: US 12,760,422 B2
(45) Date of Patent: Oct. 13, 2026

(54) METAL SURFACE TREATMENT

(71) Applicant: SPECIALTY OPERATIONS FRANCE, Lyons (FR)

(72) Inventors: Guillaume Gody, Aubervilliers (FR); Marie-Pierre Labeau, Aubervilliers (FR); Cindy Granier, Saint-Fons (FR); Justine Layec, Aubervilliers (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 672 days.

(21) Appl. No.: 18/248,508

(22) PCT Filed: Oct. 1, 2021

(86) PCT No.: PCT/EP2021/077141
§ 371 (c)(1),
(2) Date: Apr. 10, 2023

(87) PCT Pub. No.: WO2022/073880
PCT Pub. Date: Apr. 14, 2022

(65) Prior Publication Data

US 2023/0374666 A1 Nov. 23, 2023

(30) Foreign Application Priority Data

Oct. 9, 2020 (EP) .................................... 20315432

(51) Int. Cl.

| | |
|---|---|
| ***C23C 22/68*** | (2006.01) |
| ***B32B 7/12*** | (2006.01) |
| ***B32B 15/01*** | (2006.01) |
| ***B32B 15/20*** | (2006.01) |

(52) U.S. Cl.
CPC ................ *C23C 22/68* (2013.01); *B32B 7/12* (2013.01); *B32B 15/01* (2013.01); *B32B 15/20* (2013.01); *B32B 2250/02* (2013.01); *B32B 2307/752* (2013.01)

(58) Field of Classification Search
CPC ...................................................... C23C 22/66
See application file for complete search history.

(56) References Cited

U.S. PATENT DOCUMENTS 4,191,596 A * 3/1980 Dollman .............. C09D 133/00 524/413
4,564,397 A * 1/1986 Opsahl .................... C23C 22/83 148/257
4,921,552 A 5/1990 Sander et al.
5,663,266 A * 9/1997 Taylor ....................... C08F 8/30 526/323.2
6,552,116 B1 * 4/2003 Pakusch ................ C08F 265/06 526/201
2003/0091778 A1 * 5/2003 Lee ...................... C09D 133/14 524/556
2003/0114587 A1 * 6/2003 Suzuki .................. C08F 220/12 524/833
2011/0159306 A1 * 6/2011 Schellekens ......... C09D 153/00 524/460
2012/0118446 A1 * 5/2012 Fischer .................... C21D 1/63 148/28
2015/0357647 A1 12/2015 Kurata et al.
2020/0061973 A1 * 2/2020 Takasawa ................ B05D 1/28
2021/0230463 A1 * 7/2021 Seo ........................... C08F 2/26
2023/0220558 A1 * 7/2023 Kohlmann ................ C23F 1/34 252/79.1

FOREIGN PATENT DOCUMENTS

| | | |
|---|---|---|
| JP | 2004231698 A | 8/2004 |
| WO | 9713588 A1 | 4/1997 |
| WO | 2018119368 A1 | 6/2018 |
| WO | 2020109411 A1 | 6/2020 |
| WO | 2020109413 A1 | 6/2020 |

OTHER PUBLICATIONS

International Search Report issued in Application No. PCT/EP2021/077141, mailed on Mar. 1, 2022 (3 pages).
Written Opinion issued in Application No. PCT/EP2021/077141, mailed on Mar. 1, 2022 (5 pages).

* cited by examiner

*Primary Examiner* — Liam J Heincer
(74) *Attorney, Agent, or Firm* — Osha Bergman Watanabe & Burton LLP

(57) ABSTRACT

The instant invention concerns the use of at least one polymer P obtained by radical copolymerization of a mixture of (i) acrylic acid; (ii) methacrylic acid; and (iii) at least one monomer of formula: for treating a metallic surface intended to be coated by a paint, a varnish or an adhesive, for example intended to be adhesive-bonded to another surface, in order to impart a resistance to the adhesive failure to the resulting bonding.

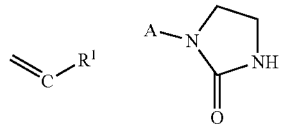

13 Claims, No Drawings

METAL SURFACE TREATMENT

This application is a national stage entry of PCT/EP2021/077141, filed on Oct. 1, 2021, which claims priority filed on 9 Oct. 2020 in EUROPE with Nr 20315432.3, the whole content of this application being incorporated herein by reference for all purposes.

The instant invention relates to the field of the treatment of surfaces based on metal, and more specifically metal surfaces intended to be coated with film-forming compositions such as paints, varnishes or adhesive compositions. The invention is especially directed to a treatment of said metal surfaces aiming at providing an enhancement of the adherence of the film-forming composition on the metal surface, which is especially efficient with adhesive compositions.

In order to provide an enhancement of the adherence of film-forming organic compositions such as paints, varnishes or adhesives on metal surfaces, especially on aluminum or steel, several methods have been proposed, including i.a. the deposit of inorganic coatings on the surface of the metal, especially the so-called "conversion coating".

The term "conversion coating" is well known in the art and refers to a layer formed on the surface of a metal, that is an advantageous replacement of native oxide on said surface (especially on aluminum), and which is obtained by the controlled chemical formation of a film or crystals on the metallic surface by reaction with chemical elements of the metallic surface, so that at least some of the cations dissolved from the metallic material are deposited in the conversion coating.

Typically, coating such conversion coatings are obtained by reacting the metal surface with solutions containing metal cations and fluorides. In the past, chromium-containing coatings have been proposed (typically obtained by reaction of the surface with a solution including $H_2CrF_6$), and, more recently, less toxic coatings based e.g. on zirconium, titanium or other metals (for example obtained by reaction of the surface with a solution including $H_2TiF_6$, $H_2ZrF_6$, $H_2HfF_6$, $H_2AlF_6$, $H_2SiF_6$, $H_2GeF_6$, $H_2SNF_4$, or $HBF_4$). A conversion coating may include other compounds such as silane precursors for example.

For enhancing the adhesion on a coating such as conversion coatings it is known to add some additives, especially organic polymers. In this connection, it has been for example described the use of polyacrylic acids. A typical additive, especially suitable for paint compositions, is ACUMER™ 1510 available from DOW (and previously from Rohm & Haas) that has been widely described for this kind of application. For more details in this connection, it may be especially be referred to WO20109411, WO20109413, WO97/13588, U.S. Pat. No. 4,191,596, or U.S. Pat. No. 4,921,552.

One aim of the present invention is to provide a new method for treating a metal surface, which imparts a good adherence of organic compositions, and especially of adhesive coating applied to the metal surface. According to the instant description, the term "adhesive coating" encompasses (i) films obtained by the coating of adhesive compositions, typically organic film forming compositions, that are mostly available as pastes, more or less fluid, and also (ii) adhesives preformed films, such as the L-F610 Epoxy Adhesive Film commercialized by L&L.

To this end, the instant invention proposes to make use of a specific polymer, optionally (but not necessarily) together with (namely before, during, or after) the formation of a conversion coating, which leads to a treated metal surface that reveals very interesting: when coated by a film-forming composition such as a paint, varnish or adhesive composition, a good adherence is obtained between the surface and the coated composition. Besides, a good protection of the surface is obtained, especially against corrosion. When the metal surface is coated with an adhesive layer, the coated surface may typically be used for ensuring a so-called "adhesive bonding" between said coated metal surface and another surface (typically a similar metal surface treated with the same polymer) that is placed in contact with all or part of the adhesive coating. In this application, the specific polymer used according to the invention reduces the occurrence of adhesive failures (in other word it imparts a kind of "resistance to the adhesive failure"). In the scope of the invention, the inventors have now observed that the strength of the adherence between the adhesive and the metal surface is especially high, to such an extent that cohesive failure appears instead of (or at least more preferably than) an adhesive failure when a sufficiently high mechanical stress is applied for separating the adhesive-bonded surfaces, especially after exposure to aggressive conditions.

Cohesive failure is understood to mean that failure between two surfaces bonded by an adhesive occurs within the adhesive, which is thus retained on both surfaces.

Adhesive failure is understood to mean that failure between two surfaces bonded by an adhesive occurs at one surface, the adhesive being retained on the other surface.

The improvement of the bonding between two surfaces treated by the polymer of the invention and then assembled by an adhesive is thus reflected by a resistance to the adhesive failure, which means that a cohesive failure will occur instead, in particular after ageing, compared to other existing treatments.

More precisely, the instant invention make use of at least one polymer P, which is a polymer obtainable by radical copolymerization of a mixture of:

(i) acrylic acid; and (ii) methacrylic acid; and (iii) and at least one monomer M which is an ethylenically unsaturated ureido having the Formula (I) below:

Formula (I)

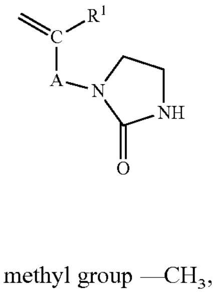

wherein:

$R^1$ is H or a methyl group $—CH_3$, and preferably H; and

A is a linkage selected from the group consisting of:

a single covalent bond; and a spacer group, such as a group $—CO—NH—(CH_2)_n—$ or $—CO—O—(CH_2)_n—$ wherein n is an integer from 1 to 5, typically equal to 2 or 3.

A suitable monomer M that may advantageously use for preparing a polymer P according to the invention has the following formula (Ia):

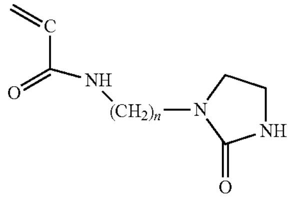

(Ia)

wherein n is an integer from 1 to 5, typically equal to 2 or 3 (typically 2).

According to an interesting embodiment, the monomer M is methacrylamidoethyl ethylene urea (MAEEU), contained for example in the commercial monomer SIPOMER® WAM II commercialized by Solvay.

More generally, the divalent spacer group A in formula (I) may typically be group $-CO-NH-(CH_2)_n-$ or $-CO-O-(CH_2)_n$, but any other covalent linker group may be contemplated, for example resulting from the reaction of a compound of formula (I-X):

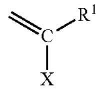

with a compound of formula (I-Y):

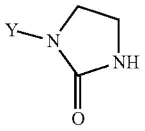

wherein X and Y are two groups reacting together for forming a covalent bond.

For example, Y may be a $-(CH_2)_m-NH_2$ group wherein m is from 1 to 4, preferably 2 or 3. In that case, X may be for example a carboxylic acid, an acid chloride, an anhydride, an epoxy or a (blocked) isocyanate.

According to another variant, Y may be a $-(CH_2)_m-OH$ group wherein m is from 1 to 4, preferably 2 or 3. In that case, X may be for example a carboxylic acid, an acid chloride, an acid bromide, an anhydride or an ester.

The polymer P is a polymer as obtained by copolymerizing monomers (i), (ii) and (iii) namely having the structure that is obtained via such a polymerization, but the polymer P is not necessarily obtained by this process. As an alternative, the polymer P may for example be obtained by a first step (E1) of copolymerizing acrylic acid, methacrylic acid and a compound of formula (I-X) leading to a polymer P0 and then a second step (E2) of post-grafting of the polymer P0 by a reaction with compound (I-Y).

When Y is a $-(CH_2)_m-NH_2$ group in the compound (I-Y) used in step (E2), the compound (I-X) used in the step (E1) may advantageously be selected from: additional acrylic or methacrylic acid, or ester thereof; maleic anhydride; vinylbenzyl chloride; vinylbenzyl bromide; glycidylmethacrylate; epoxystyrene and (blocked) isocyanatoethyl methacrylate. There is a preference for additional acrylic or methacrylic acid, or ester thereof; maleic anhydride; glycidylmethacrylate and epoxystyrene.

When Y is a $-(CH_2)_m-OH$ group in the compound (I-Y) used in step (E2), the compound (I-X) used in the step (E1) may advantageously be selected from additional acrylic acid, methacrylic acid, maleic anhydride or their esters and (blocked) isocyanatoethyl methacrylate. There is a preference for additional acrylic acid, methacrylic acid, maleic anhydride or their esters.

The at least one polymer P, which is a polymer obtained by radical copolymerization of a mixture of:

(i) acrylic acid (AA); and (ii) methacrylic acid (MAA); and (iii) at least one monomer M which is an ethylenically unsaturated ureido having the Formula (I)

may further comprise (iv) below 20% mol of one or more further monomers M' selected from the group consisting of hydrophobic monomers and/or amphiphilic monomers.

In this embodiment where additional monomers M' are present in polymer P, said hydrophobic and/or amphiphilic monomers are selected from the group consisting of mono-ethylenically unsaturated monomers:

i) alkyl esters of maleic anhydride and (meth)acrylic acid, such as monomethyl maleic anhydride ester, dimethyl maleic anhydride ester, monoethyl maleic anhydride ester, diethyl maleic anhydride ester, methyl (meth) acrylate, ethyl (meth)acrylate, propyl (meth)acrylate, isopropyl (meth)acrylate, n-butyl (meth)acrylate, 2-ethylhexyl (meth)acrylate, n-hexyl (meth)acrylate, n-octyl (meth)acrylate, ii) hydroxyalkyl esters of maleic anhydride and (meth) acrylic acid, such as monohydroxyethyl maleic anhydride ester, dihydroxyethyl maleic anhydride ester, hydroxyethyl (meth)acrylate, hydroxypropyl (meth) acrylate, hydroxybutyl (meth)acrylate iii) ethoxylates and propoxylates that derive from maleic anhydride, such as such as poly(propylene oxide)-b-poly(ethylene oxide) maleic acid half ester or diester alkyl-poly(ethylene oxide) maleic acid half ester or diester, iv) ethoxylates and/or propoxylates that derive from the ethoxylation and/or propoxylation of hydroxyalkyl (meth)acrylic acid, such as poly(propylene oxide)-b-poly(ethylene oxide)-ethyl (meth)acrylate v) ethoxylates and/or propoxylates that derive from the (trans)esterification of (meth)acrylic acid and esters such as poly(propylene oxide)-b-poly(ethylene oxide) (meth)acrylate and alkyl-poly(ethylene oxide) (meth) acrylate vi) Vinyl ethers such as methyl vinyl ether, ethyl vinyl ether, propyl vinyl ether, 2-ethylhexyl vinyl ether, vinyl cyclohexyl ether, dodecyl vinyl ether, 2-(diethylamino) ethyl vinyl ether, 2-(di-n-butylamino)ethyl vinyl ether vii) allyl ethers such as methyl vinyl ether, ethyl vinyl ether, propyl vinyl ether, 2-ethylhexyl vinyl ether, viii) Vinyl esters, such as vinyl acetate or vinyl propionate ix) alkyl-substituted acrylamides such as N-tert-butyl acrylamide or N-methyl (meth)acrylamide.

Preferably, additional monomers M' that are present in polymer P are selected from the group consisting of:

i) monoethyl maleic anhydride ester, diethyl maleic anhydride ester, methyl (meth)acrylate, ethyl (meth)acrylate, isopropyl (meth)acrylate, n-butyl (meth)acrylate, 2-ethylhexyl (meth)acrylate ii) monohydroxyethyl maleic anhydride ester, dihydroxyethyl maleic anhydride ester, hydroxyethyl (meth)acrylate, hydroxypropyl (meth)acrylate, hydroxybutyl (meth)acrylate iii) poly(propylene oxide)-b-poly(ethylene oxide) maleic acid half ester
iv) poly(propylene oxide)-b-poly(ethylene oxide)-ethyl (meth)acrylate
v) poly(propylene oxide)-b-poly(ethylene oxide) (meth) acrylate, alkyl-poly(ethylene oxide) (meth)acrylate
vi) vinyl acetate, vinyl propionate.

Preferably there is no vinylaromatic monomer in the list, in particular no styrene.

The proportion in mol of monomers M' cannot exceed 20% mol of the total mol of monomers (acrylic acid+methacrylic acid+M+M') present in polymer P, otherwise the polymerization in water will occur in a dispersed medium because the polymer won't be soluble in water anymore, requiring the use of a surfactant which is not desirable in the final application. Advantageously the proportion in mol of monomers M' is below 15% mol, preferably below 10% mol and more preferably below 5% mol.

Indeed, the presence of hydrophobic and/or amphiphilic monomers M' is limited due to the requirement of carrying the polymerization of the polymer P of the invention in aqueous solution without the use of surfactants and not in emulsion like it is the case for latexes. The monomers used have to be hydrosoluble or highly dispersible and should not affect the solubility of the polymer P obtained therefrom.

That's why, in a preferred embodiment of the invention, there is no further monomer M' in the polymer P, which means that polymer P is obtained by radical copolymerization of a mixture consisting essentially of, notably consisting of:

(i) acrylic acid; and
(ii) methacrylic acid; and
(iii) at least one monomer M which is an ethylenically unsaturated ureido having the Formula (I).

According to this embodiment where no further monomer is present in polymer P apart from (i), (ii) and (iii), the solubility in water of polymer P is high. This solubility in water is evaluated by measuring transparency at 1% of active in water: transmittance measured in a 1 cm optical path length glass cell has to be higher than 95%.

This requirement of hydrosolubility of polymer P is allowing the polymer P to be easy to use in the application, because it can be sprayed or deposited in any manner without foaming, or without using anti-foams to control the foam. This is not the case for polymers obtained by polymerization in emulsion, for latexes for instance, where foam is a limiting factor for their sprayability as well as the latex destabilization under high shear.

Typically, the polymer P is obtained by radical copolymerization of a mixture of acrylic acid, methacrylic acid, and at least one monomer M. Preferably, the polymer P is obtained by radical copolymerization of a mixture having the following molar ratio, based on the total quantity of acrylic acid, methacrylic acid and monomer M of formula (I):

acrylic acid (AA): from 5 to 50%, preferably from 20 to 40% (e.g., about 25 to 30%),
methacrylic acid (MAA): from 30 to 90%, preferably from 60 to 80% (e.g., about 65 to 75%)
monomer M: from 1 to 50%, for example from 1 to 30%, notably from 2 to 20% (e.g., about 3 to 10%)

The above molar ratios of each monomer in the polymer P are showing particularly good results in terms of resistance to the adhesive failure to the bonding when compared to polymers that are out of the above ranges. For example, when there is no MAA in the polymer P then the polymer P does not have the right mechanical and structural properties (strength, Tg, crystallinity, hygroscopicity . . . ). When no monomer M is present, then the performances in terms of adherence are not satisfactory. When the amount of M is too high (above 50%), then there is a risk of coloration of the product and the resulting polymer is not economically viable.

Besides, the polymer P used according to the invention preferably has a number average molecular weight (Mn) of at least 7,500 Da, e.g. 10 kDa to 1500 kDa, for example 10 kDa to 150 kDa, notably between 10 and 100 kDa. Typically, the polymer P used according to the invention has a number average molecular weight (Mn) of from 20 to 100 kDa, e.g., 30 to 100 kDa.

A polymer P especially suitable for the invention is a statistical (random) copolymer having a number average molecular weight of about 30 to 100 kDa, that is the copolymerization product of a mixture of acrylic acid, methacrylic acid, and a monomer M, preferably in a molar ratio of about 28/70/02 to 20/70/10.

The number and weight average molecular weights are measured by Size Exclusion Chromatography (SEC). Notably the SEC is equipped with a MultiAngle Laser Light Scattering (MALLS) Mini Dawn TREOS detector and an Agilent concentration detector (RI detector). The SEC-MALLS system is running on three columns Varian Aquagel OH mixed H, 8 μm, 3*30 cm at a flow rate of 1 mL/min and with the following mobile phase: 85% water, 100 mM NaCl, 25 mM $NaH_2PO_4$, 25 Mm $Na_2HPO_4$—15% methanol. Polymer samples were diluted down to 0.5 active wt % in the mobile phase for at least 4 hours then filtrated in a Millipore filter 0.45 μm and 100 μL were injected in the mobile phase flow. Absolute molar masses were obtained with the dn/dC of the poly(acrylic acid) equal to 0.1875 mL/g.

The polymer P can be prepared by conventional radical polymerization and by reversible-deactivation (controlled) radical polymerization. The reversible-deactivation (controlled) radical polymerization technology will be selected according to the composition of the targeted polymer, for example by MADIX with xanthates such as Rhodixan A1 from Solvay for polymers containing up to 30 mol % of methacryl-based monomers (example AA/MAA/acrylamidoethyl ethylene urea=50/30/20 mol/mol/mol), or by RAFT with trithiocarbonates such as 4-((((2-carboxyethyl)thio)carbonothioyl)thio)-4-cyanopentanoic acid (BM1433, from Boron Molecular) for polymers containing more than 30 mol % of methacryl-based monomers (example AA/MAA/MAEEU=22/70/08 mol/mol/mol).

According to a specific aspect, one specific object of the instant invention is the use of at least one polymer P as defined above for treating a metallic surface intended to be coated by a paint, a varnish or an adhesive, preferably an adhesive. The metal surface to be treated is preferably a surface comprising a metal selected from aluminum, steel, zinc, magnesium and their alloys. The invention is especially interesting for metal surface of aluminum or aluminum alloy.

The polymer P is preferably used for treating the metallic surface at a pH of at least 5, preferably at a pH of at least 7, for example between 7 and 10.

According to a possible (but not compulsory) embodiment, a conversion coating is applied on the metallic surface to be treated, by reaction of said surface with a conversion composition (in other words, a conversion composition is applied on the metallic surface for forming a conversion coating thereon). In that case, typically:

the conversion composition includes all or part of the polymer P as an additive; and/or the conversion coating is applied on the metallic surface and then all or part of the polymer P is applied on the conversion coating.

According to another possible embodiment, compatible with the previous one, all or part of the polymer P is present in a paint, a varnish or an adhesive coating applied on the surface, optionally after application of a conversion coating on the metal surface.

According to another aspect, one specific object of the invention is a process for coating a metallic surface with a paint, a varnish or an adhesive, including a step of treating said surface with at least one composition including at least one polymer P as defined above. In that scope, the composition comprising the polymer P may typically be:

a conversion composition including a polymer P; and/or a solution or a dispersion of the polymer P, preferably applied on the surface after having applied a conversion coating on the surface to be treated; and/or the paint, varnish or adhesive, that may comprise all or part of the polymer P.

The polymer P useful according to the invention and the compositions comprising the polymer P (especially the conversion compositions including a polymer P; the paint, varnish or adhesive compositions containing the same; and the solutions or dispersions including the polymer P useful for treating the surface) also constitute specific objects of the instant invention.

Typically, the polymer P is present in the conversion composition and/or in a solution or dispersion applied on the surface to be treated. In that case, the paint, varnish or adhesive is generally applied on a surface previously treated by the polymer. According to some specific embodiments, an additional layer may applied between the treated surface and the paint, varnish or adhesive.

One more specific object of the instant invention is the use of at least one polymer P as defined above for treating a first metallic surface (S1) intended to be bonded to a second surface (S2) by adhesive bonding and for imparting a resistance to adhesive failure to the bonding (in other words for providing the joint between surfaces S1 and S2 with a resistance to adhesive failure). An additional advantage of the adhesive bonding obtained according to the invention is that it is highly resistant to corrosive atmospheres and to wet atmospheres, which lead to long lasting adhesive bonding. In most cases, the polymer is also used for obtaining this additional effect (namely for further imparting to the bonding a resistance to corrosive atmospheres and to wet atmospheres, in other words for obtaining both a very effective, but also long lasting adhesion).

In other words, the use of at least one polymer P as defined above for treating a first metallic surface (S1) intended to be bonded to a second surface (S2) by adhesive bonding and for imparting a resistance to the adhesive failure to the bonding is also providing a very good resistance to ageing of the adhesive bonding. Such a property can be measured according to tensile tests on so-called "Single Lap Shear" (SLS) assemblies, such as defined in ASTM D-1002 10, performed on freshly bonded SLS assemblies and performed on SLS assemblies after ageing in corrosive atmospheres, wet atmospheres, or repeated cycles of corrosive atmospheres followed by wet atmospheres, such as ASTM G85—Annex 3. Other tests simultaneously combine a corrosion stress and a mechanical stress (e.g. compression load), such as the BV 101-07, known as Ford Durability Stress Test for Adhesive Lap-shear Bonds or Arizona Proven Ground Exposure (APGE). Notably an adhesive bonding with the polymer P according to the invention between two surfaces S1 and S2 has been demonstrated to provide failure facies, after ageing, that remain more cohesive.

Typically (but not necessarily), the second surface (S2) is also a metallic surface, having or not the same nature as the first surface (S1). According to an advantageous embodiment, the second surface (S2) is a metallic surface also treated with a polymer P of formula (a), generally but not necessarily identical to the polymer P of the first surface (S1).

More generally, the polymer P used according to the invention is preferably used for treating both surfaces (S1) and (S2) before the adhesive bonding of the two surfaces, especially when (S2) is a metallic surface.

The first metal surface (S1) is preferably a surface comprising a metal selected from aluminum, steel, zinc, magnesium, titanium, copper and their alloys, or cobalt-nickel alloys. The invention is especially interesting for metal surface of aluminum or aluminum alloys. The invention is especially interesting when the surface (S1) is a metal surface of aluminum or aluminum alloy.

The second surface (S2) may be metallic or non-metallic surface.

According to an interesting embodiment, the second surface (S2) is a surface comprising a metal, advantageously selected from aluminum, steel, zinc, magnesium titanium, copper and their alloys, or cobalt-nickel alloys. According to one embodiment, the nature of the surfaces (S1) and (S2) is the same, but they can also be distinct according to other possible embodiments of the invention. According to an interesting variant, both surfaces (S1) and (S2) are metal surface of aluminum or aluminum alloys.

According to another possible embodiment, the second surface (S2) is a non-metallic surface, for example a plastic surface e.g. based on polyamide, PEEK or ABS; or a composite surface based e.g. on CFRP or Glass Fiber Reinforced Plastics.

Whatever the exact nature of surfaces (S1) and (S2), according to a possible embodiment, a conversion coating may be applied on the metallic surface (S1), by reaction of said surface with a conversion composition (in other words, a conversion composition is applied on the metallic surface for forming a conversion coating thereon). The use of a conversion coating is however not compulsory according to the invention, and, according to a specific embodiment, no conversion coating is applied on the surface (S1). When a conversion composition is used, typically:

the conversion composition includes all or part of the polymer P as an additive; and/or the conversion coating is applied on the surface (S1) and then all or part of the polymer P is applied on the conversion coating.

The second surface (S2) may also receive a similar conversion coating, in the same conditions, especially when this second surface (S2) is a metallic surface. But again, the use of a conversion coating is not compulsory according to the invention, and, according to a specific embodiment, no conversion coating may be applied on the surface (S2).

According to another possible embodiment, compatible with the previous ones, all or part of the polymer P is contained in the adhesive composition applied onto the surfaces (S1) and (S2). According to this embodiment, the polymer may typically be introduced in the adhesive composition as a solid powder, said powder comprising the polymer alone or the polymer at the surface of a mineral filler (said powder may typically be obtained by spray drying a solution or suspension of the polymer, typically in presence of mineral filler). According to another aspect, one other specific object of the invention is a process for bonding a first metallic surface (S1) with a second surface (S2) (said surfaces being preferably as defined above), including:

- treating said first surface (S1) with at least one composition including at least one polymer P as defined above (said surface (S1) being preferably cleaned and/or activated before the treatment with the polymer P); and
- optionally treating the second surface (S2) with at least one composition including at least one polymer P as defined above (said surface (S2) being then preferably cleaned and/or activated before the treatment with the polymer P); and
- bonding the surfaces (S1) and (S2) via an adhesive composition applied between the two surfaces.

In that scope, the composition comprising the polymer P may typically be:

- a conversion composition including a polymer P; and/or
- a solution or a dispersion of the polymer P, preferably applied on the surface after having applied a conversion coating on the surface to be treated; and/or
- the adhesive composition, that may comprise all or part of the polymer P.

Typically, the polymer P is present in the conversion composition and/or in a solution or dispersion applied on a conversion coating. In that case, the adhesive is applied on a surface previously treated by the polymer.

According to some specific embodiments, an additional layer is applied between the treated surface (S1) and the adhesive (this is for example the case for the treatment of metal coil or part on a first site, that has then to be bonded on a second site: in that case, a lubricant may be applied on the treated coil or part, in order to protect it during transportation and storage and to facilitate downstream operations (coil cutting into sheets, blanking, stamping, forming, . . . ).

According to yet another aspect, a specific object of the instant invention are the materials comprising two adhesive-bonded surfaces including a first metal surface comprising a metal surface (S1) which is in all or part (i) treated with a polymer P as defined above and (ii) bonded to a second surface (S2) preferably as defined above via an adhesive.

These materials include i.a. materials that have a metal surface (S1) in all or part covered by:

- at least one coating (typically a conversion coating and/or a paint, a varnish or an adhesive layer) comprising at least one polymer P; and/or
- a layer (typically a conversion coating) comprising a reaction product of the polymer P as defined above with a metal of the treated surface or another compound present in said layer, or a polymer P strongly linked with said other compound (via a complexation, a ionic bonding or hydrogen bonding for example).

Specific features and possible embodiments will now be described in more details.

The Metal Surface (S1)

Any metal surface may be treated with a polymer P of the invention, but the invention is especially suitable for treating metal surfaces of:

- aluminum or an aluminum-based alloy; or
- steel, for example galvanized steel (hot dip galvanized HDG or electrogalvanized EG); or cold rolled steel (CRS); or
- magnesium or magnesium-based alloys; or
- zinc or zinc-based alloys; or
- titanium or titanium-based alloys.

The invention is especially interesting for metal surface of aluminum and aluminum alloys, such as Aluminum Alloy AA 5754 tested in the appended examples, or other alloys such as those of Series 1xxx, 2xxx, 3xxx, 4xxx, 5xxxx, 6xxx, 7xxx, such as AA1050, 2024, 3003, 5005, 5182, 5754, 6111, 6016, 6060, 6063, 6182, 7075.

The Optional Conversion Coating

When a conversion coating is applied on one or both of the surfaces (S1) and/or (S2), it may be obtained by contacting the surface with any conversion composition known from the prior art.

Contacting the metal surface with the conversion composition may be made by any means known per se, such as dip coating in a conversion bath or spray coating, as illustrative examples.

The conversion composition used according to the invention may typically contain fluorides anions and cationic metals, e.g. compounds such as $H_2CrF_6$, or more preferably chromium free compounds such as $H_2TiF_6$, $H_2ZrF_6$, $H_2HfF_6$, $H_2AlF_6$, $H_2SiF_6$, $H_2GeF_6$, $H_2SNF_4$, or $HBF_4$.

The conversion composition may also include other compounds, such as silane precursors for example, and/or cerium salts, and/or terbium molybdate.

In addition, according to a specific embodiment, the conversion composition may contain all or part of the polymer P used according to the invention for treating the surface. In that case, the application of the conversion layer leads per se to a surface treatment according to the invention.

Otherwise, the treatment is typically obtained after the formation of the conversion layer, by contacting the metal surface carrying the conversion layer with the polymers P (they may typically be applied on the conversion layer in the form of a solution or a suspension of polymers P, or within a paint, a varnish or an adhesive composition applied on the conversion layer).

According to a specific embodiment, it may be contemplated to make use of the polymer P both in the conversion composition and within the adhesive composition applied on the conversion layer.

Should the disclosure of any patents, patent applications, and publications which are incorporated herein by reference conflict with the description of the present application to the extent that it may render a term unclear, the present description shall take precedence.

The following example illustrates the invention.

EXAMPLE

Polymers according to the invention, obtained by a copolymerization of a mixture of acrylic acid, methacrylic acid, and methacrylamidoethyl ethylene urea (MAEEU), were tested in these examples.

Example 1.1

The polymer P1 (AA/MAA/MAEUU 27/70/03 mol/mol/mol) has been prepared as follows: 71 g of a 2,2'-Azobis (2-methylpropionamidine)dihydrochloride (V50) solution at 10% active content in water, 2.28 g of AA at 70% active content in water, 2.58 g of sodium hydroxide at 35% active content in water and 110 g of deionized water are charged at room temperature into a 700 ml reactor fitted with adequate stirring, inlets, feeding and temperature control devices.

The reactor temperature is then heated to 60° C. within 1 h, with nitrogen degassing.

When temperature has reached 60° C., 2 feeds are started, under nitrogen blanket:

43.9 g of AA at 70% active in water, over 4 h 23.9 g of SIPOMER® WAM 11 containing 10.3 g of MAEEU and 6.8 g of MAA, plus 156.2 g of MAA at 60% in water, plus 108.3 g of sodium hydroxide at 35% in water, over 5 h Once the longest feed is over, the reaction mixture is maintained for 2 additional hours at 60° C., before it is cooled down to room temperature and diluted with 119 g of deionized water to get the solids content at about 31%.

The smooth incorporation of monomers was monitored by 1H NMR spectroscopy over the polymerization and the final product was analyzed by both 1H NMR spectroscopy and size exclusion chromatography.

A Brucker 300 MHz spectrometer was used to record proton nuclear magnetic resonance ($^1H$ NMR) spectra. To measure AA, MAA and MAEEU conversions, four drops of the reaction mixture were diluted in around 1 g of deuterated water ($D_2O$). AA conversion >99%; MAA conversion >99.9%; MAEEU conversion >99.9%.

Average molecular weights were measured by Size Exclusion Chromatography (SEC) equipped with a MultiAngle Laser Light Scattering (MALLS) Mini Dawn TREOS detector and an Agilent concentration detector (RI detector). The SEC system is running on three columns Varian Aquagel OH mixed H, 8 μm, 3*30 cm at a flow rate of 1 mL/min and with the following mobile phase: 85% water, 100 mM NaCl, 25 mM NaH2PO4, 25 Mm Na2HPO4—15% methanol. Polymer samples were diluted down to 0.5 active wt % in the mobile phase for at least 4 hours then filtrated in a Millipore filter 0.45 μm and 100 microliters were injected in the mobile phase flow. Absolute molar masses were obtained with the dn/dC of the poly(acrylic acid) equal to 0.1875 mL/g. $M_n$=44 kg/mol; $M_w$=134 kg/mol; Đ=3.

Example 1.2 the Same Process was Used to Prepare the Polymer P2 (AA/MAA/MAEUU 22/70/08 mol/mol/mol)

Total weight of V50 at 10% active in water: 73.3 g

Total weight of AA at 70% in water: 37.1 g

Total weight of MAA at 60% in water: 136.2 g

Total weight of SIPOMER® WAM II solution: 62.3 g

AA conversion >99%; MAA conversion >99.9%; MAEEU conversion >99.9%.

$M_n$=70 kg/mol; $M_w$=400 kg/mol; Đ=6.

Performances were assessed through Single Lap Shear (SLS) tests, before and after ageing in corrosive conditions. Coupons were prepared according to the protocol below and assembled to form Single Lap assemblies as described in D1002-10.

Step 1—20 coupons (aluminum alloy coupons: AA5754 H111, from FBCG; 100 mm long, 25 mm wide, 3 mm thick) are cleaned and etched all together in one single step, combining cleaning and etching, in a 4 L bath at 50° C. contained in a stainless steel tank, typically made by diluting a commercially available formulation, DBT ALU 200, available from Chemtec Aertec (5 g of DBT ALU 200 into 995 g of water) for 3 min. under light stirring. The coupons were then rinsed twice during 1 min. with deionized water.

Step 2—the coupons are then pre-treated by dipping for 2 min. in the treatment bath, containing the polymer at 50° C. and at several concentration indicated in the Table 1 below. They are then rinsed altogether with a flow of deionized water for 1 min. and dried for 30 min. at 60° C.

Step 3—the coupons are then assembled in pairs, each pair forming a so called single lap shear "assembly": two coupons are placed horizontally, parallel, one above the other forming an overlap of 12.5 mm long and 25 mm wide ("overlap zone", including one of terminal zone of each of the two coupons of 25 mm wide, namely the last 12.5 mm of the 100 mm length of the coupon). A structural high temperature curing epoxy adhesive bead (Betamate 1496, from Dow) is applied with a gun under 7 bars on the overlap zone of the lower coupon. The upper coupon is then pressed, thus forming a bonding zone of 12.5 mm long, and 25 mm wide. Paper clips are used to maintain the assembly integrity before and during curing. The adhesive is then cured according to adhesive producer guidelines, typically for 40 min. at 180° C. Finally, paper clips are removed.

Step 4—tensile strength test I on assemblies as obtained in step 3

Used material: Zwick/Roell—Z50, with jaws grasping assembly tips over 50 mm and a pulling speed of 10 mm/min. (each jaw holds one of the bonded coupon of the pair, on a grasping zone of 50 mm of said coupon located at the end zone of each coupon opposite to the overlap zone. The upper jaw is then moved upwards for pulling each of the coupon horizontally in the direction starting from the bonding zone towards the grasping zone)

Step 5—tensile strength test II performed on assemblies as obtained in step 3 after ageing 5.1. Ageing Cyclic Test A cyclic ageing test is performed according to ASTM G85—Annex 3 (SWAAT, 2011)

in a corrosion chamber Q-FOG CRH 600 L, from Q-FOG in the following conditions:

a 30 min. acidified salt fog spray followed by a 90 min. soak at >98% relative humidity under the following conditions:

Chamber temperature—constant 49° C.

Air saturator temperature—constant 57° C.

Relative humidity—>98% pH of fall out solution—2.8-3.0

Volume of fall out solution—1.0-2.0 ml/80 $cm^2$/hour

Exposure period—1000 hours

After the exposure period is completed, the assemblies are washed down with lukewarm water to remove and neutralize excess acid and any remaining salt residues.

All assemblies were then air dried using forced ambient temperature before being for submitted to lap-shear tensile testing.

5.2. Tensile Strength Test

In the conditions of the tensile strength test I of step 4

The tests were performed on three assemblies before ageing and on five assemblies after ageing, with the following variations in step 2.

Polymers were diluted with de-ionized water and the resulting treatment bath was tested as such (no pH adjustment, "native pH").

TABLE 1

| conditions of step 2 | | | |
|---|---|---|---|
| Test no. | Polymer | Concentration of polymer in the treatment bath | pH of the treatment bath |
| 1 | NONE (control) The coupons were only degreased and etched. | — | — |
| 2 | P1 | 1000 ppm | 7.7 (native pH) |
| 3 | P2 | 1000 ppm | 8.1 (native pH) |

The obtained results are reported in Tables 2 to 5 below (the values are average values). Below are reported performances before ageing, after ageing, and the ratio between values after ageing and values before ageing, called "retention":

TABLE 2

| Maximum LOAD | | | | | |
|---|---|---|---|---|---|
| | Maximum LOAD | | | | |
| | Before ageing (test I) | | After ageing (test II) | | |
| Test no. | maximum load (N) | STD (N) | maximum load (N) | STD (N) | Retention (%) |
| 1 (control) | 10838 | 218 | 3862 | 4293 | 36 |
| 2 | 9242 | 363 | 6784 | 1139 | 73 |
| 3 | 9407 | 451 | 6881 | 151 | 73 |

TABLE 3

| STRAIN measured at the maximum load | | | | | |
|---|---|---|---|---|---|
| | STRAIN measured at the maximum load | | | | |
| | Before ageing (test I) | | After ageing (test II) | | |
| Test no. | Strain (MPa) | STD (MPa) | Strain (MPa) | STD (MPa) | Retention (%) |
| 1 (control) | 35 | 0.7 | 12 | 14 | 36 |
| 2 | 30 | 1.2 | 22 | 3.6 | 73 |
| 3 | 30 | 1.4 | 22 | 0.5 | 73 |

TABLE 4

| ENERGY measured at the maximum load | | | | | |
|---|---|---|---|---|---|
| | ENERGY measured at the maximum load | | | | |
| | Before ageing (test I) | | After ageing (test II) | | |
| Test no. | maximum Energy (J) | STD (MPa) | maximum Energy (J) | STD (MPa) | Retention (%) |
| 1 (control) | 12 | 0.8 | 3 | 4.0 | 24 |
| 2 | 22 | 3.5 | 8 | 3.9 | 38 |
| 3 | 24 | 4.4 | 8 | 0.5 | 35 |

TABLE 5

| FACIES after bond failure | | |
|---|---|---|
| | FACIES after failure*** | |
| Test no. | Before ageing (test I) | After ageing (test II) |
| 1 (control) | c | a |
| 2 | c | a/c |
| 3 | c | ~c |

***
(c): cohesive fracture
(a): adhesive fracture
(a/c): adhesive and cohesive fracture
(~c): rather cohesive fracture

The invention claimed is:

1. A method for treating a metal surface intended to be coated by a paint, a varnish or an adhesive, the method comprising:

applying onto the metal surface at least one polymer P obtained by radical copolymerization of a mixture of (i) acrylic acid; and (ii) methacrylic acid; and (iii) at least one monomer M having the Formula (I) below:

Formula (I)

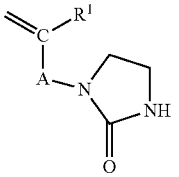

wherein:

$R^1$ is H or a methyl group —$CH_3$; and

A is a linkage selected from the group consisting of:

a single covalent bond; and a spacer group, wherein the polymer P is obtained by radical copolymerization of a mixture having the following molar ratio, based on the total quantity of acrylic acid, methacrylic acid and monomer M of formula (I):

acrylic acid: from 5 to 50%, methacrylic acid: from 30 to 90%, monomer M: from 1 to 50%.

2. The method according to claim 1, wherein the metal surface is a first metal surface (S1) intended to be bonded to a second surface (S2) by adhesive bonding, wherein polymer P imparts a resistance to the adhesive failure to the bonding.

3. The method according to claim 2, wherein polymer P further imparts to the bonding a resistance to corrosive atmospheres and to wet atmospheres.

4. The method according to claim 2, wherein the first metal surface (S1) is a surface comprising a metal selected from aluminum, steel, zinc, magnesium titanium, copper and their alloys, or cobalt-nickel alloys.

5. The method according to claim 4, wherein the first metal surface (S1) is a surface of aluminum or aluminum alloy.

6. The method according to claim 2, wherein the second surface (S2) is a metal surface.

7. The method according to claim 2, wherein the second surface (S2) is a non-metal surface.

8. The method according to claim 2, wherein the polymer P is used for treating both surfaces first metal surface (S1)

and second surface (S2) before the adhesive bonding of the first metal surface (S1) and second surface (S2).

9. The method according to claim 1, wherein polymer P further comprises below 20% mol of one or more further monomers M' selected from the group consisting of hydrophobic monomers and amphiphilic monomers selected from the group consisting of:

i) monoethyl maleic anhydride ester, diethyl maleic anhydride ester, methyl (meth)acrylate, ethyl (meth)acrylate, isopropyl (meth)acrylate, n-butyl (meth)acrylate, 2-ethylhexyl (meth)acrylate ii) monohydroxyethyl maleic anhydride ester, dihydroxyethyl maleic anhydride ester, hydroxyethyl (meth)acrylate, hydroxypropyl (meth)acrylate, hydroxybutyl (meth)acrylate iii) poly (propylene oxide)-b-poly (ethylene oxide) maleic acid half ester iv) poly (propylene oxide)-b-poly (ethylene oxide)-ethyl (meth)acrylate v) poly (propylene oxide)-b-poly (ethylene oxide) (meth) acrylate, alkyl-poly (ethylene oxide) (meth)acrylate vi) vinyl acetate, vinyl propionate.

10. The method according to claim 9, wherein the proportion in mol of monomers M' is below 15% mol.

11. The method according to claim 1, wherein the polymer P has a number average molecular weight of at least 7,500 Da.

12. The method of claim 1, wherein the method further comprises coating the metal surface with a paint, a varnish or an adhesive.

13. The method of claim 1, wherein the spacer group is $-CO-NH-(CH_2)_n-$ or $-CO-O-(CH_2)_n$, wherein n is an integer from 1 to 5.

* * * * *